(12) United States Patent
Suzuki et al.

(10) Patent No.: US 8,446,945 B2
(45) Date of Patent: *May 21, 2013

(54) APPARATUS AND METHOD FOR DECODING PICTURE DATA

(75) Inventors: Teruhiko Suzuki, Kanagawa (JP); Liming Wang, Tokyo (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,611

(22) Filed: Mar. 26, 2012

(65) Prior Publication Data

US 2012/0183061 A1  Jul. 19, 2012

Related U.S. Application Data

(63) Continuation of application No. 12/063,713, filed as application No. PCT/JP2006/316170 on Aug. 17, 2006, now Pat. No. 8,144,765.

(30) Foreign Application Priority Data

Aug. 17, 2005 (JP) ................................. 2005-236845

(51) Int. Cl.
  *H04N 7/12* (2006.01)
(52) U.S. Cl.
  USPC ................................ 375/240.01; 375/240.26
(58) Field of Classification Search
  USPC ............................................ 375/240–240.29
  See application file for complete search history.

(56) References Cited

U.S. PATENT DOCUMENTS

| 5,155,593 | A  | * | 10/1992 | Yonemitsu et al. | ...... | 375/240.13 |
| 5,387,940 | A  |   | 2/1995  | Kwok             |        |            |
| 5,699,117 | A  | * | 12/1997 | Uramoto et al.   | .......... | 348/390.1 |
| RE36,999  | E  | * | 12/2000 | Yonemitsu et al. | ...... | 375/240.16 |
| 6,345,388 | B1 |   | 2/2002  | Nishio et al.    |        |            |
| 6,525,783 | B1 | * | 2/2003  | Kim et al.       | ..................... | 348/714 |
| 2005/0265458 | A1 | * | 12/2005 | Woo          | ........................ | 375/240.17 |

FOREIGN PATENT DOCUMENTS

| JP | 3-179987  | 8/1991  |
| JP | 06-062389 | 3/1994  |
| JP | 7-162870  | 6/1995  |
| JP | 08-512441 | 12/1996 |

(Continued)

OTHER PUBLICATIONS

Kwok et al., "Method and Apparatus for Providing Scaleable Compressed Video Signal," Abstract of International Publication No. WO 95/02303, published Jan. 19, 1995.

(Continued)

*Primary Examiner* — Hong Cho
(74) *Attorney, Agent, or Firm* — Finnegan, Henderson, Farabow, Garrett & Dunner, L.L.P.

(57) ABSTRACT

A decoding apparatus for decoding two encoded field data obtained by hierarchically encoding two field data associated with each of a plurality of picture data composing a moving picture image. The decoding apparatus comprising: a first decoding unit configured to decode one of the two encoded field data and obtain information associated with the two encoded field data; a conversion unit configured to interpolate first predicted image data generated by decoding by the first decoding unit according to the information and generate second predicted image data of a scanning position of the other encoded field data of the two encoded field data; and a second decoding unit configured to decode the other encoded field data of the two encoded field data based on the second predicted image data generated by the conversion unit.

2 Claims, 12 Drawing Sheets

FOREIGN PATENT DOCUMENTS

| | | |
|---|---|---|
| JP | 8-512441 | 12/1996 |
| JP | 09-149415 | 6/1997 |
| JP | 9-149415 | 6/1997 |
| JP | 9-205630 | 8/1997 |
| JP | 10-112857 | 4/1998 |
| JP | 2002-10253 | 1/2002 |
| WO | WO 95/02303 | 1/1995 |

OTHER PUBLICATIONS

Japanese Office Action dated Nov. 22, 2011 for Japanese Application No. 2005-236845, 3 pages.

Chiang, Tihao et al., "Hierarchical Coding of Digital Television," IEEE Communications Magazine, May 1994, pp. 38-45.

Puri, A. et al, "Temporal Resolution Scalable Video Coding," AT&T Bell Labs, IEEE 1994, pp. 947-951.

Wiegand, Thomas et al., "Overview of the H.264/AVC Video Coding Standard," IEEE Transactions on Circuits and Systems for Video Technology, vol. 13, No. 7, Jul. 2003, pp. 560-576.

Extended European Search Report, dated Apr. 25, 2012 regarding EP Application No. 06782783.2, 9 pages.

Office Action from Japanese Patent Office for Japanese Patent Application No. 2005-236845, dated Jun. 19, 2012, 7 pages.

Office Action from Japanese Patent Office for Japanese Patent Application No. 2011-097569, dated Mar. 12, 2013, 5 pages.

* cited by examiner

APPARATUS AND METHOD FOR DECODING PICTURE DATA

RELATED APPLICATIONS

This application is a continuation of U.S. application Ser. No. 12/063,713, filed on Feb. 13, 2008 (now issued as U.S. Pat. No. 8,144,765, issued on Mar. 27, 2012), the entire contents of which are incorporated herein by reference. In addition, this application claims the benefit of priority to Japanese patent application number 2005-236845, filed in the Japanese Patent Office on Aug. 17, 2005, which is incorporated herein by reference in its entirety.

TECHNICAL FIELD

The present invention relates to a coding apparatus, coding method, and program for coding image data and a decoding apparatus, decoding method, and program for decoding image data.

BACKGROUND ART

In recent years, following to the MPEG (Moving Picture Experts Group) which handles image data digitally, and, at that time, compresses the data by a discrete cosine transform or other orthogonal transform and motion compensation utilizing the redundancy peculiar to image information, as the purpose of transmitting and storing information with a high efficiency, a coding apparatuses and decoding apparatuses based on the H.264/AVC (Advanced Video Coding) and other coding schemes having higher compression ratios have been spreading in both distribution of information by broadcast stations etc. and reception of information at general homes.

Further, at present, work is underway for standardization of the SVC (Scalable Video Coding) extending the function of scalability based on this H.264/AVC. The current specifications of SVC are combined in the JSM (Joint Scalable Video Model).

In an SVC coding apparatus, an input image is divided by an image hierarchical (layering or layered data processing) circuit into two classes of for example an upper significant layer and lower significant layer. After that, an upper significant layer coding circuit encodes the upper significant layer, and the lower significant layer coding circuit encodes the lower significant layer. Then, the encoded upper significant layer and lower significant layer are multiplexed and transmitted.

The lower significant layer is also called as a "base layer" and is a layer having a low image quality. When decoding only a bit stream of the lower significant layer, an image having relatively low image quality is decoded. However, the lower significant layer includes more important information as the image quality.

The upper significant layer is also called as an "enhancement layer" and is a layer for enhancing the image quality and decoding an image having a high image quality. When decoding a bit stream of the upper significant layer in addition to the bit stream of the lower significant layer, it is possible to decode an image having a higher image quality.

In the above coding apparatus, when the upper significant layer coding circuit performs intra-coding, a decoded image obtained by coding in the lower significant layer coding circuit, then decoding can be used as a predicted image.

DISCLOSURE OF THE INVENTION

Problem to be Solved by the Invention

In this regard, the conventional coding apparatus performing the hierarchical coding explained above encodes progressive image data as the upper significant layer, but cannot encode interlace image data.

However, there is a demand for handling interlace image data in the upper significant layer as well.

Further, there is a similar demand in a decoding apparatus decoding image data hierarchically encoded in the coding apparatus explained above as well.

Accordingly, when performing hierarchical (layering or layered data) coding, there is a demand to provide a coding apparatus, coding method, and program able to handle interlace image data in each of the two classes.

Further, there is a demand to provide a decoding apparatus, decoding method, and program able to decode any interlace image data encoded by the two classes (layers) explained above.

Means for Solving the Problem

A coding apparatus of an embodiment of the present invention is a coding apparatus for hierarchically (layering or layered data) coding top field data and bottom field data divided each of a plurality of picture data composing a moving picture image, having a first coding unit configured to encode one field data between two field data of the top field data and bottom field data divided from the picture data, a conversion unit configured to interpolate first predicted image data generated by the first coding unit encoding the one field data to generate second predicted image data of a scanning position of the other field data between the two field data, and a second coding unit configured to encode the other field data between the two field data based on the second predicted image data generated by the conversion unit.

Further, a coding apparatus of an embodiment of the present invention is a coding apparatus for hierarchically coding top field data and bottom field data divided from each of a plurality of picture data composing a moving picture image, having a first coding means for encoding one field data between two field data of the top field data and the bottom field data divided from the picture data, a converting means configured to interpolate first predicted image data generated by the first coding means encoding the one field data and generate second predicted image data of the scanning position of the other field data between the two field data, and a second coding means for encoding the other field data between the two field data based on the second predicted image data generated by the converting means.

A coding method of an embodiment of the present invention is a coding method for hierarchically (layering or layered data) coding top field data and bottom field data divided from each of a plurality of picture data composing a moving picture image, including a first step of encoding one field data between two field data of the top field data and the bottom field data divided from the picture data, a second step of interpolating first predicted image data generated by the first step encoding the one field data and generating second predicted image data of the scanning position of the other field data between the two field data, and a third step of encoding the other field data between the two field data based on the second predicted image data generated in the second step.

A program of an embodiment of the present invention is a program executed by a computer for hierarchically (layered data) coding top field data and bottom field data divided from each of a plurality of picture data composing a moving picture image, making the computer execute a first routine of encoding one field data between two field data of the top field data and the bottom field data divided from the picture data, a second routine of interpolating first predicted image data generated by the first routine encoding the one field data and generating second predicted image data of the scanning position of the other field data between the two field data, and a third routine of encoding the other field data between the two field data based on the second predicted image data generated in the second routine.

A decoding apparatus of an embodiment of the present invention is a decoding apparatus for decoding two encoded field data obtained by hierarchically encoding two field data divided from each of a plurality of picture data composing a moving picture image, comprising a first decoding unit configured to decode one encoded field data between the two encoded field data, a conversion unit configured to interpolate first predicted image data generated by decoding by the first decoding unit and generate second predicted image data of a scanning position of the other encoded field data between the two encoded field data, and a second decoding unit configured to decode the other encoded field data between the two encoded field data based on the second predicted image data generated by the conversion unit.

Further, a decoding apparatus of an embodiment of the present invention is a decoding apparatus for decoding two encoded field data obtained by hierarchically (layering or layered data) encoding two field data divided from each of a plurality of picture data composing a moving picture image, having a first decoding means for decoding one encoded field data between the two encoded field data, a converting means for interpolating a first predicted image data generated by decoding by the first decoding means and generating a second predicted image data of the scanning position of the other encoded field data between the two encoded field data, and a second decoding means for decoding the other encoded field data between the two encoded field data based on the second predicted image data generated by the converting means.

A decoding method of an embodiment of the present invention is a decoding method for decoding two encoded field data obtained by hierarchically (layering or layered data) encoding two field data divided from each of a plurality of picture data composing a moving picture image, including a first step of decoding one encoded field data between the two encoded field data, a second step of interpolating a first predicted image data generated by the decoding in the first step and generating a second predicted image data of the scanning position of the other encoded field data between the two encoded field data, and a third step of decoding the other encoded field data between the two encoded field data based on the second predicted image data generated in the second step.

A program of an embodiment of the present invention is a program executed by a computer for decoding two encoded field data obtained by hierarchically (layering or layered data) encoding two field data divided from each of a plurality of picture data composing a moving picture image, making the computer execute a first routine of decoding one encoded field data between the two encoded field data, a second routine of interpolating first predicted image data generated by the decoding in the first routine and generating second predicted image data of the scanning position of the other encoded field data between the two encoded field data, and a third routine of decoding the other encoded field data between the two encoded field data based on the second predicted image data generated in the second routine.

Effect of the Invention

According to the present invention, there can be provided a coding apparatus, coding method, and program able to handle interlace image data in each of two classes when performing hierarchical encoding.

Further, according to the present invention, there can be provided a decoding apparatus, decoding method, and program able to decode any interlace image data encoded in the two classes explained above.

DESCRIPTION OF NOTATIONS

1 . . . coding/decoding processing system, 2 . . . coding apparatus, 3 . . . decoding apparatus, 10 . . . hierarchical (layering or layered data processing) circuit, 11 . . . delay circuit, 12 . . . lower significant layer coding circuit, 13 . . . conversion circuit, 14 . . . upper significant layer coding circuit, 15 . . . multiplex circuit, 23, 123 . . . picture rearrangement circuits, 31, 131 . . . processing circuits, 32, 132 . . . orthogonal transform circuits, 33, 133 . . . quantization circuits, 34, 134 . . . rate control circuits, 35, 135 . . . reversible coding circuits, 36, 136 . . . buffer memories, 37, 137 . . . inverse quantization circuits, 38, 138 . . . inverse orthogonal transform circuits, 39, 139 . . . adder circuits, 40, 140 . . . de-block filters, 41, 141 . . . frame memories, 42, 142 . . . intra-prediction circuits, 43, 143 . . . motion prediction/compensation circuits, 51 . . . division circuit, 52 . . . delay circuit, 53 . . . lower significant layer decoding circuit, 54 . . . conversion circuit, 55 . . . upper significant layer decoding circuit, 56 . . . re-composing circuit, 60, 160 . . . storage buffers, 61, 161 . . . reversible decoding circuits, 62, 162 . . . inverse quantization circuits, 63, 163 . . . inverse orthogonal transform circuits, 64, 164 . . . adder circuits, 65, 165 . . . de-block filters, 66, 166 . . . frame memories, 67, 167 . . . picture rearrangement buffers, 69, 169 ... intra-prediction circuits, and 70, 170 ... motion prediction/compensation circuits.

BEST MODE FOR CARRYING OUT THE INVENTION

Below, a coding/decoding processing system of an embodiment of the present invention will be explained.

The embodiment of the present invention is based on temporable/scalability technology.

Figure 1:
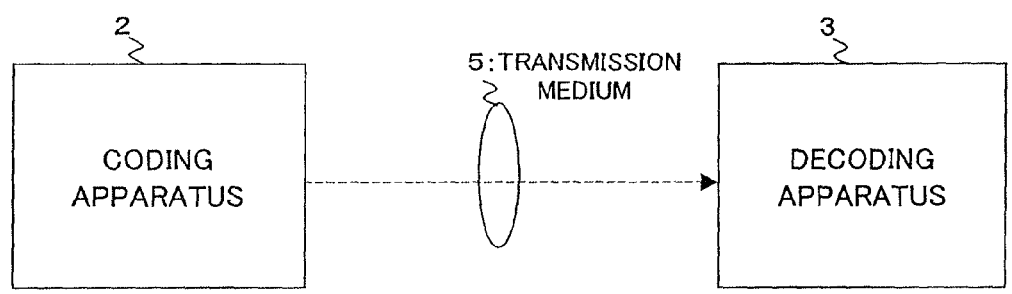
FIG. 1 is a view of the configuration of a coding/decoding processing system of an embodiment of the present invention.

FIG. 1 is a conceptual diagram of a coding/decoding processing system 1 of the present embodiment.

The coding/decoding processing system 1 has a coding apparatus 2 located at a transmission side and a decoding apparatus 3 located at a reception side which are connected via a transmission medium 5.

Figure 5:
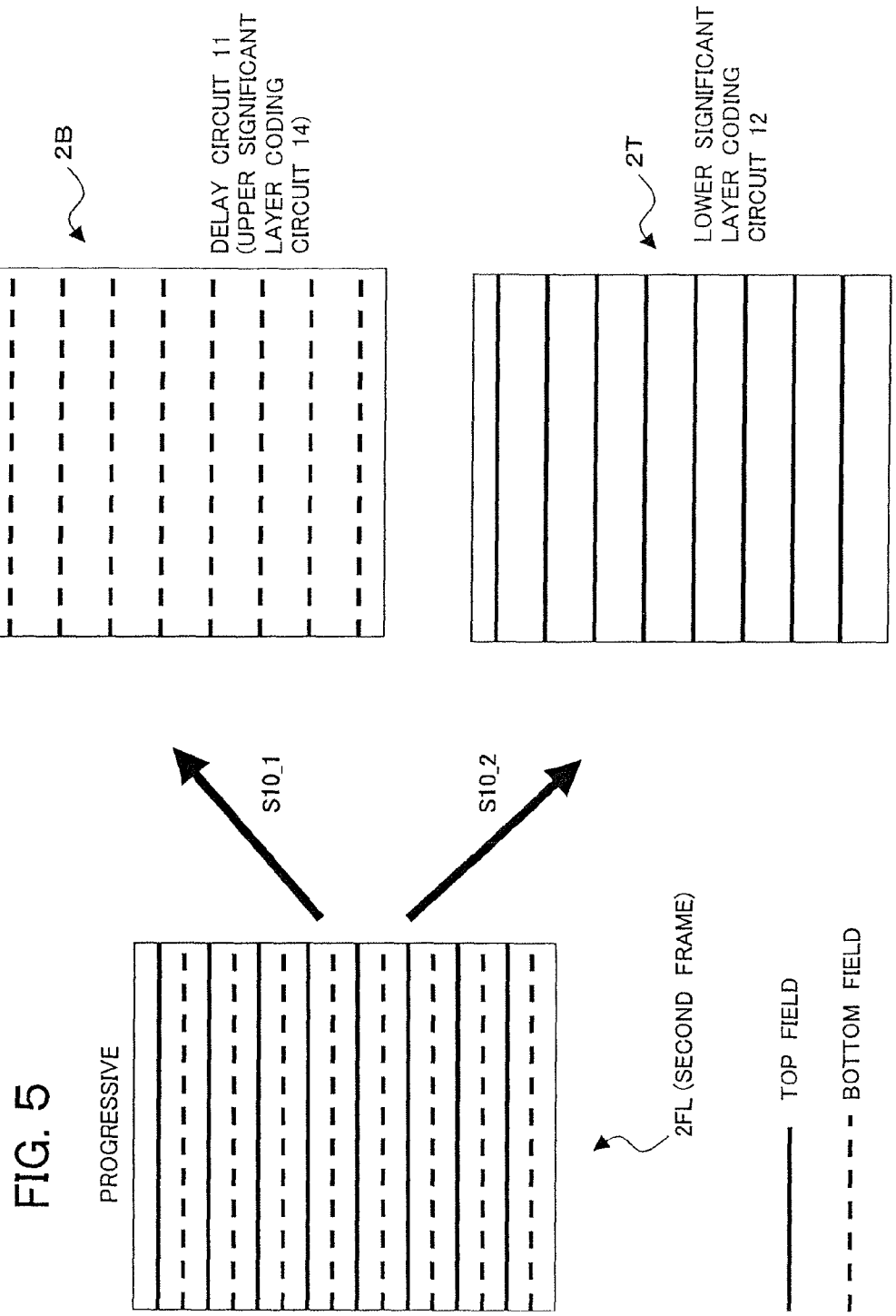
FIG. 5 is a diagram for explaining the processing of the hierarchical circuit shown in FIG. 2.

The present embodiment is characterized in that, in the coding apparatus 2, as shown in FIG. 5 etc., the motion prediction/compensation circuit 43 calculates a weighting parameter based on reference image data REF and image data to be processed and performs explicit weighting prediction based on that parameter.

In this weighting prediction, predicted image data PI is generated based on the reference image data adjusted based on the parameter.

In the coding/decoding processing system 1, the coding apparatus 2 on the transmission side generates frame image data (bit stream) compressed according to a discrete cosine transform, Karhunen-Loewe transform, or other orthogonal transform and motion compensation, modulates the frame image data, then transmits the same via an artificial satellite broadcast wave, cable TV network, telephone network, mobile phone network, or other transmission media.

In the reception side, the decoding apparatus 3 demodulates the received image signal, then expands it by the inverse transform to the orthogonal transform at the time of the above modulation and motion compensation to generate frame image data for use.

Note that the above transmission medium 5 may be an optical disc, magnetic disc, semiconductor memory, or other storage media as well.

Figure 9:
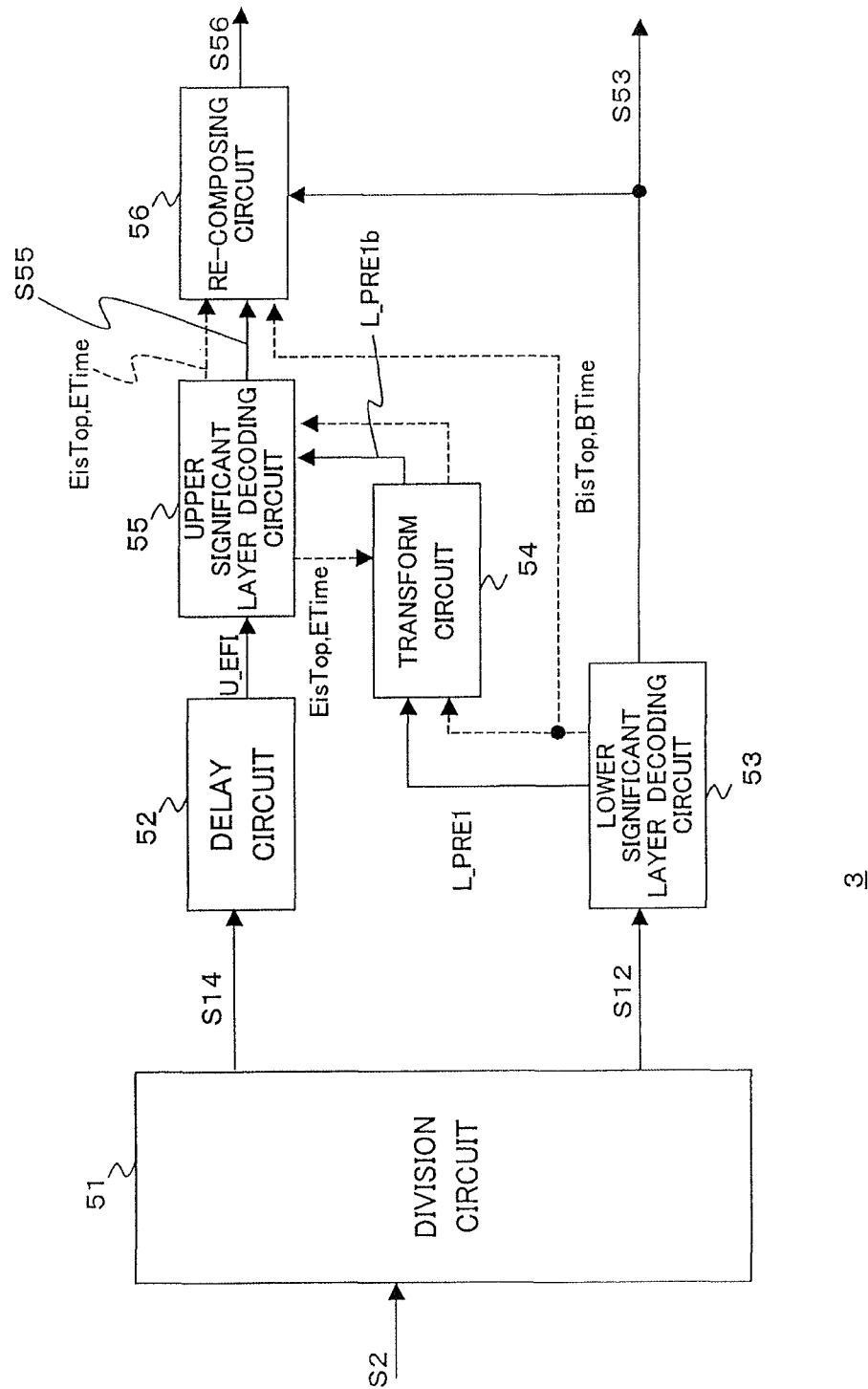
FIG. 9 is a view of the configuration of a decoding apparatus shown in FIG. 1.

In the present embodiment, as shown in FIG. 9, the hierarchical circuit 10 divides progressive image data (progressive signal) S9 to be coded into interlace image data S10_1 and S10_2.

The lower significant layer coding circuit 12 encodes the interlace image data S10_2 to generate lower significant encoded data S12.

The conversion circuit 13 interpolates the lower significant predicted image data L_PRE generated by the lower significant layer coding circuit 12 to generate lower significant predicted image data L_PREb having a scanning position matched with the interlace image data S10_1 and outputs this to the upper significant layer coding circuit 14.

The upper significant layer coding circuit 14 encodes the interlace image data S10_1 based on the lower significant predicted image data L_PREb to generate upper significant encoded data S14.

Coding Apparatus

The coding apparatus 2 shown in FIG. 1 will be explained next.

Figure 2:
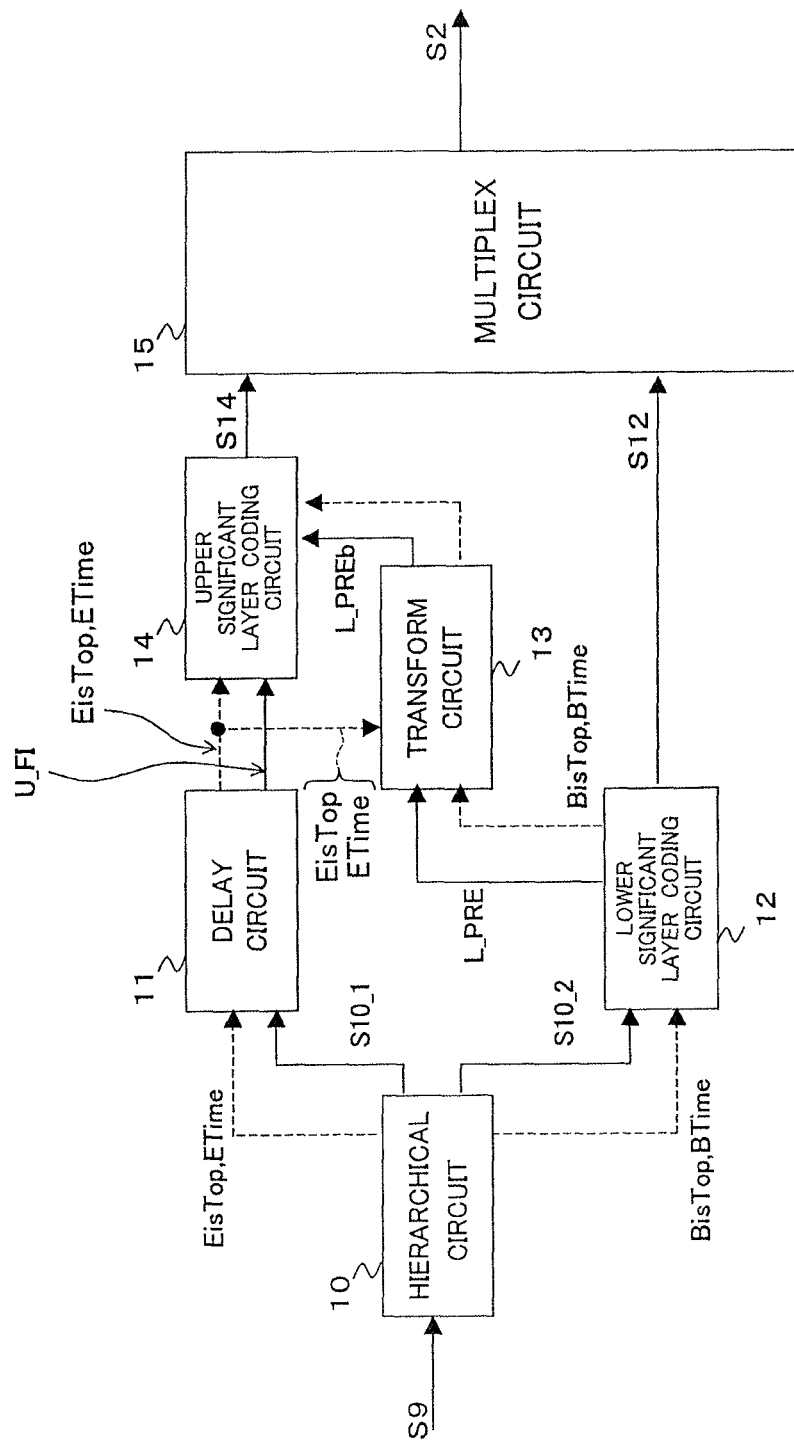
FIG. 2 is a view of the configuration of a coding apparatus shown in FIG. 1.

FIG. 2 is a view of the overall configuration of the coding apparatus 2 shown in FIG. 1.

The coding apparatus 2 has for example a hierarchical (layering or layered data processing) circuit 10, delay circuit 11, lower significant layer coding circuit 12, conversion circuit 13, upper significant layer coding circuit 14, and multiplex circuit 15.

Hierarchical Circuit

The hierarchical (layered data processing) circuit 10 receives as input the progressive image data (progressive signal) to be coded and divides each of a plurality of frame data (picture data) composing the progressive image data S9 to top field data and bottom field data.

The progressive image data S9 is for example 60 frames/sec.

Figure 4:
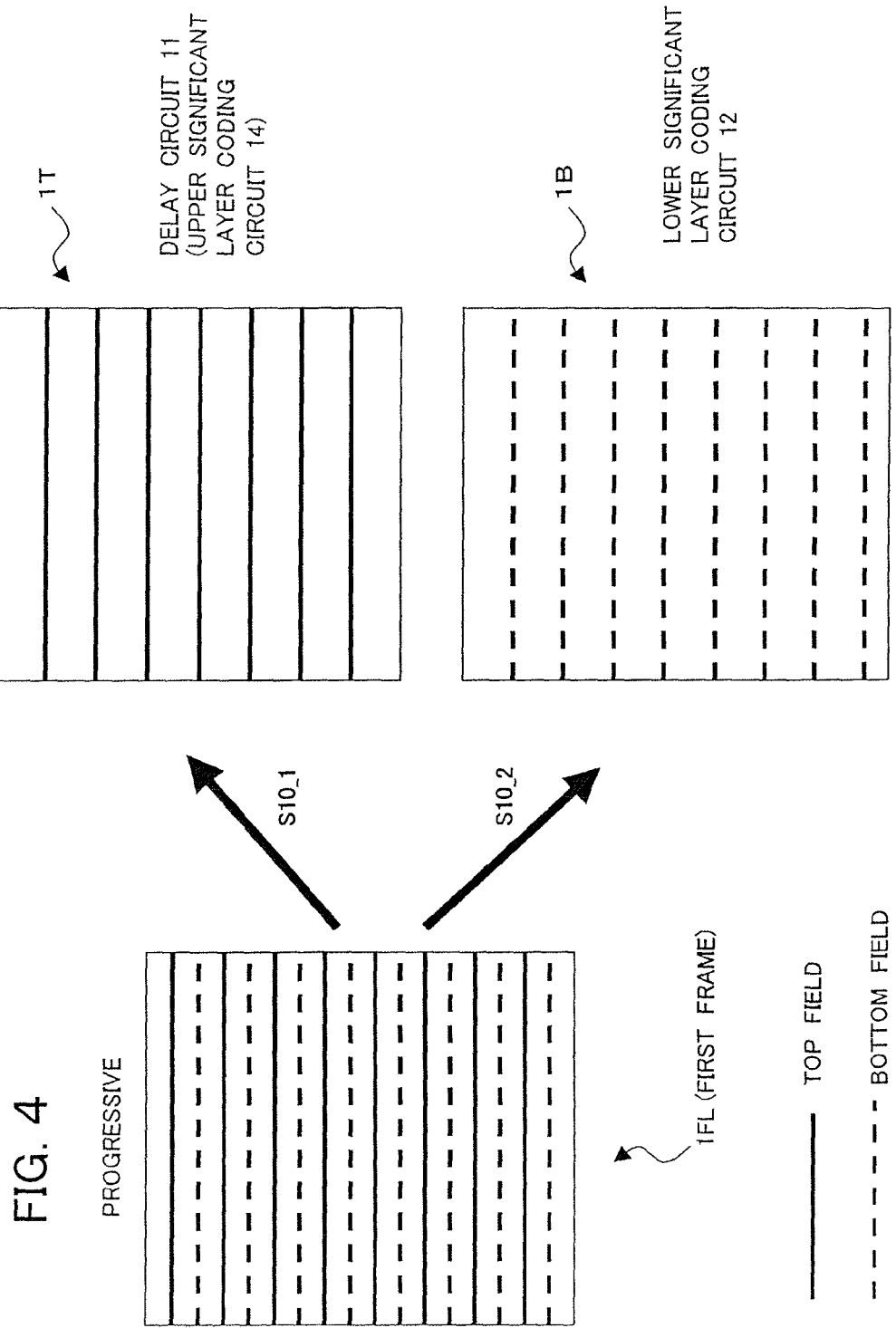
FIG. 4 is a diagram for explaining the processing of the hierarchical circuit shown in FIG. 2.

The hierarchical circuit 10 alternately outputs the above divided top field data and bottom field data to the delay circuit 11 and the lower significant layer coding circuit 12. Namely, the hierarchical circuit 10, as shown in FIG. 4, divide first frame data 1FL composing the progressive image data S9 to top field data 1T and bottom field data 1B, writes the top field data 1T into the delay circuit 11, and outputs the bottom field data 1B to the lower significant layer coding circuit 12.

The hierarchical circuit 10, as shown in FIG. 5, divides the next frame data 2FL to top field data 2T and bottom field data 2B, outputs the top field data 2T to the lower significant layer coding circuit 12, and writes the bottom field data 2B into the delay circuit 11.

In the present embodiment, the field data written into the delay circuit 11 from the hierarchical circuit 10 is referred to as the "interlace image data S10_1", and the field data output from the hierarchical circuit 10 to the lower significant layer coding circuit 12 is referred to as the "interlace image data S10_2".

The hierarchical circuit 10 writes attribute data EisTop showing whether or not the field is the top field and attribute data ETime showing the time of that field into the delay circuit 11 corresponding to each of the top field data and bottom field data.

The hierarchical circuit 10 outputs attribute data BisTop showing whether or not the field is the top field and attribute data BTime showing the time of that field to the lower significant layer coding circuit 12 corresponding to each of the top field data and bottom field data.

Delay Circuit

The delay circuit 11 outputs the top field data and bottom field data input from the hierarchical circuit 10 as upper significant field data U_FI to the upper significant layer coding circuit 14 while delaying these by for example exactly the processing time in the lower significant layer coding circuit 12 and conversion circuit 13.

The delay circuit 11 delays the attribute data EisTop and ETime of the upper significant field data U_FI by for example exactly the processing time in the lower significant layer coding circuit 12 and conversion circuit 13 and outputs the same to the upper significant layer coding circuit 14.

Lower Significant Layer Coding Circuit

The lower significant layer coding circuit 12 encodes the top field data and bottom field data input from the hierarchical circuit 10. The lower significant layer coding circuit 12 encodes the interlace image data having the field data input from the delay circuit 11 and lower significant layer coding circuit 12 as 1 (one) frame data.

The above interlace image data is for example 30 frames/sec.

Figure 6:
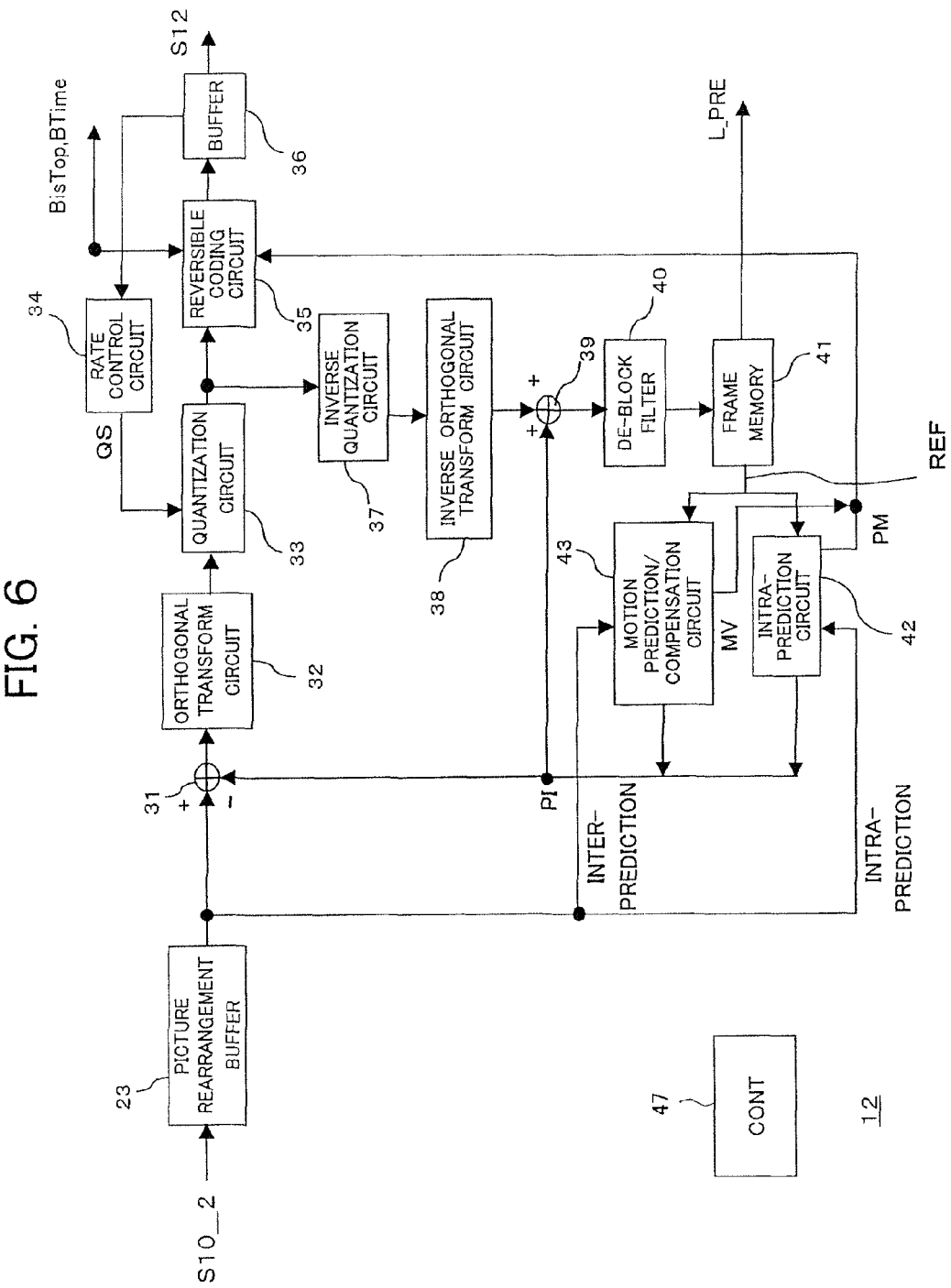
FIG. 6 is a view of the configuration of a lower significant layer coding circuit shown in FIG. 2.

FIG. 6 is a view of the configuration of the lower significant layer coding circuit 12 shown in FIG. 2.

The lower significant layer coding circuit 12 has for example a picture rearrangement circuit 23, processing circuit 31, orthogonal transform circuit 32, quantization circuit 33, rate control circuit 34, reversible coding circuit 35, buffer memory 36, inverse quantization circuit 37, inverse orthogonal transform circuit 38, adder circuit 39, de-block filter 40, frame memory 41, intra-prediction circuit 42, motion prediction/compensation circuit 43, and control circuit 47.

The control circuit 47 performs the control for the following processing in the lower significant layer coding circuit 12.

The picture rearrangement circuit 23 rearranges field data of the interlace image data S10_2 input from the hierarchical circuit 10 shown in FIG. 2 to a sequence of coding in accordance with a GOP (Group Of Pictures) structure including picture types I, P, and B and outputs the same to the processing (adder/subtractor) circuit 31, intra-prediction circuit 42, and motion prediction/compensation circuit 43.

The processing circuit 31 generates image data showing a difference between the field data or frame data to be coded input from the picture rearrangement circuit 23 and the predicted image data PI input from the intra-prediction circuit 42 or motion prediction/compensation circuit 43 and outputs this to the orthogonal transform circuit 32.

The orthogonal transform circuit 32 applies a discrete cosine transform (DCT), Karhunen-Loewe transform, or other orthogonal transform to the image data input from the processing circuit 31 to generate image data showing the transform coefficient (for example DCT coefficient) and outputs this to the quantization circuit 33.

The quantization circuit 33 quantizes the image data (transform coefficient before the quantization) input from the orthogonal transform circuit 32 based on a quantization scale QS input from the rate control circuit 34 to generate image data showing the transform coefficient after the quantization and outputs this to the reversible coding circuit 35 and inverse quantization circuit 37.

The rate control circuit 34 generates for example the quantization scale QS based on the image data read out from the buffer memory 36 and outputs this to the quantization circuit 33.

The reversible coding circuit 35 stores the image data obtained by variable length coding of the image data input from the quantization circuit 33 in the buffer 36. At this time, the reversible coding circuit 35 stores the attribute data BisTop and BTime input from the hierarchical circuit 10 in the header data etc.

The attribute data BisTop is stored as for example a dpd#output#delay at a picture timing SEI in the bit stream. Further, the attribute data BTime is stored as pic#struct in SEI.

The reversible coding circuit 35 stores a movement vector MV input from the motion prediction/compensation circuit 43 or a difference movement vector thereof, identification data of the reference image data, and the intra-prediction mode input from the intra-prediction circuit 42 in the header data etc.

The image data stored in the buffer memory 36 is read out as the lower significant encoded data S12 to the multiplex circuit 15 shown in FIG. 2.

The inverse quantization circuit 37 applies the inverse quantization processing corresponding to the quantization at the quantization circuit 33 to the image data from the quantization circuit 33, generates data obtained by that, and outputs this to the inverse orthogonal transform circuit 38.

The inverse orthogonal transform circuit 38 applies the inverse transform to the orthogonal transform in the orthogonal transform circuit 32 to the data input from the inverse quantization circuit 37 and outputs the thus generated image data to the adder circuit 39.

The adder circuit 39 adds the image data input (decoded) from the inverse orthogonal transform circuit 38 and the predicted image data PI input from the intra-prediction circuit 42 or motion prediction/compensation circuit 43 to generate the reference (re-composed) picture data and outputs this to the de-block filter 40.

The de-block filter 40 eliminates block distortion of the reference picture data input from the adder circuit 39 and writes this into the frame memory 41.

The reference picture data written in the frame memory 41 is read out as the lower significant predicted image data L_PRE from the frame memory 41 and output to the conversion circuit 13 shown in FIG. 2.

The intra-prediction circuit 42 determines a mode of intra-prediction minimizing a residue in a macro block to be intra-encoded and a block size of the prediction block.

The intra-prediction circuit 42 uses 4×4 and 16×16 pixels as block sizes.

The intra-prediction circuit 42, when intra-prediction is selected, outputs the predicted image data PI according to the intra-prediction to the processing circuit 31 and adder circuit 39.

The motion prediction/compensation circuit 43 performs the motion prediction based on the reference picture data REF which is already locally decoded after the coding and stored in the frame memory 41 and determines the movement vector minimizing the residue and the block size of the motion compensation.

The motion prediction/compensation circuit 43 uses 16×16, 16×8, 8×16, 8×8, 8×4, 4×8, and 4×4 pixels as block sizes.

The motion prediction/compensation circuit 43, when inter-prediction is selected, outputs the predicted image data PI according to the inter-prediction to the processing circuit 31 and adder circuit 39.

Conversion Circuit

A conversion circuit (predicted image data interpolation circuit) 13 shown in FIG. 2 will be explained next.

When the condition that the upper significant field data U_FI input from the delay circuit 11 by the upper significant layer coding circuit 14 (interlace image data S10_1 read out from the delay circuit 11) and the lower significant predicted image data L_PRE output to the conversion circuit 13 by the lower significant layer coding circuit 12 are field data of the same timing, one is the top field data, and the other is the bottom field data is satisfied, the scanning positions of these are different.

For this reason, the conversion circuit 13 judges whether or not the above condition is satisfied based on the attribute data EisTop and ETime input from the delay circuit 11 and the attribute data BisTop and BTime input from the lower significant layer coding circuit 12. When judging that the condition is satisfied, it applies interpolation to the lower significant predicted image data L_PRE input from the lower significant layer coding circuit 12 to generate the lower significant predicted image data L_PREb having the matching scanning position explained above and outputs this to the upper significant layer coding circuit 14.

Figure 3:
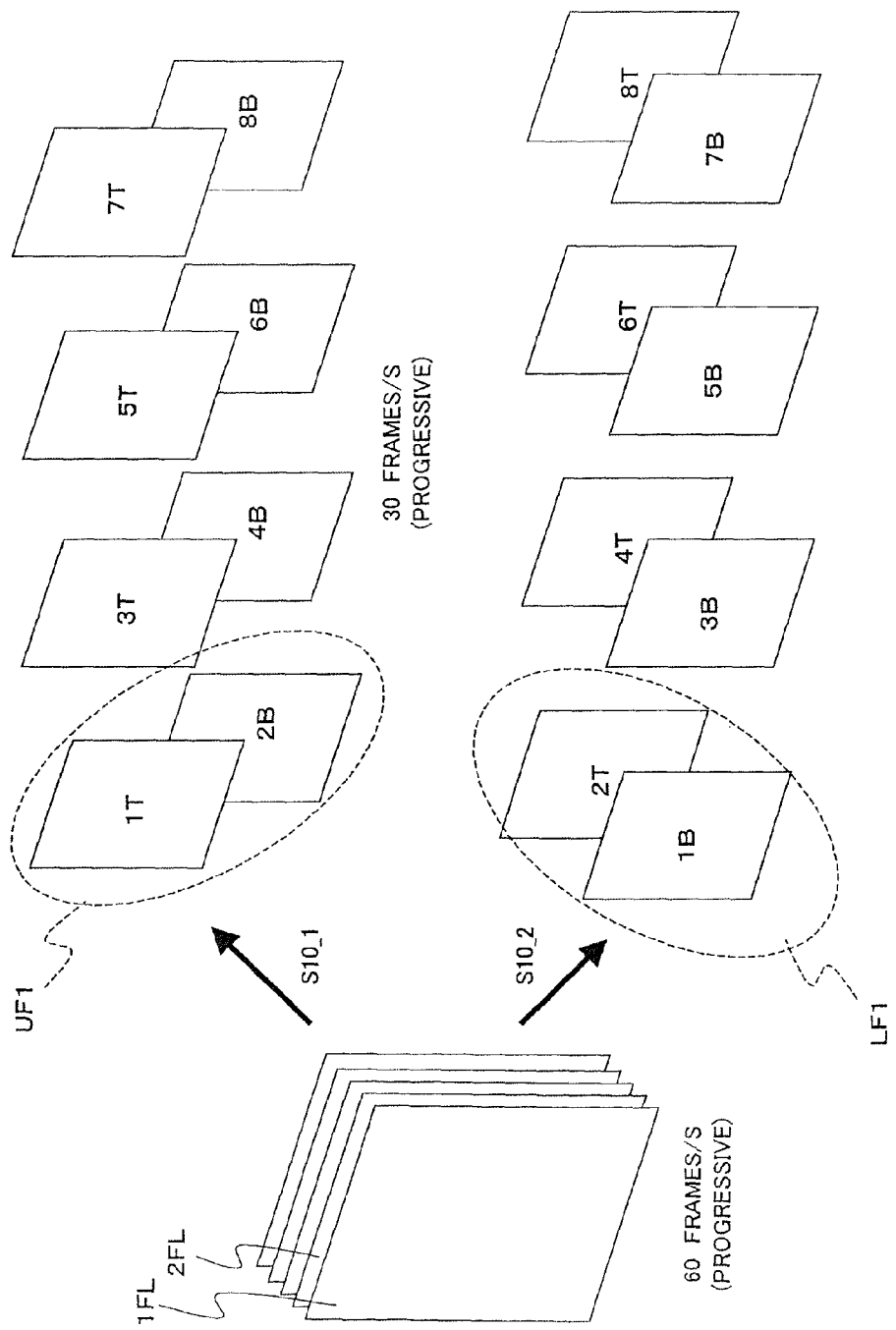
FIG. 3 is a diagram for explaining the processing of a hierarchical circuit shown in FIG. 2.
Figure 7:
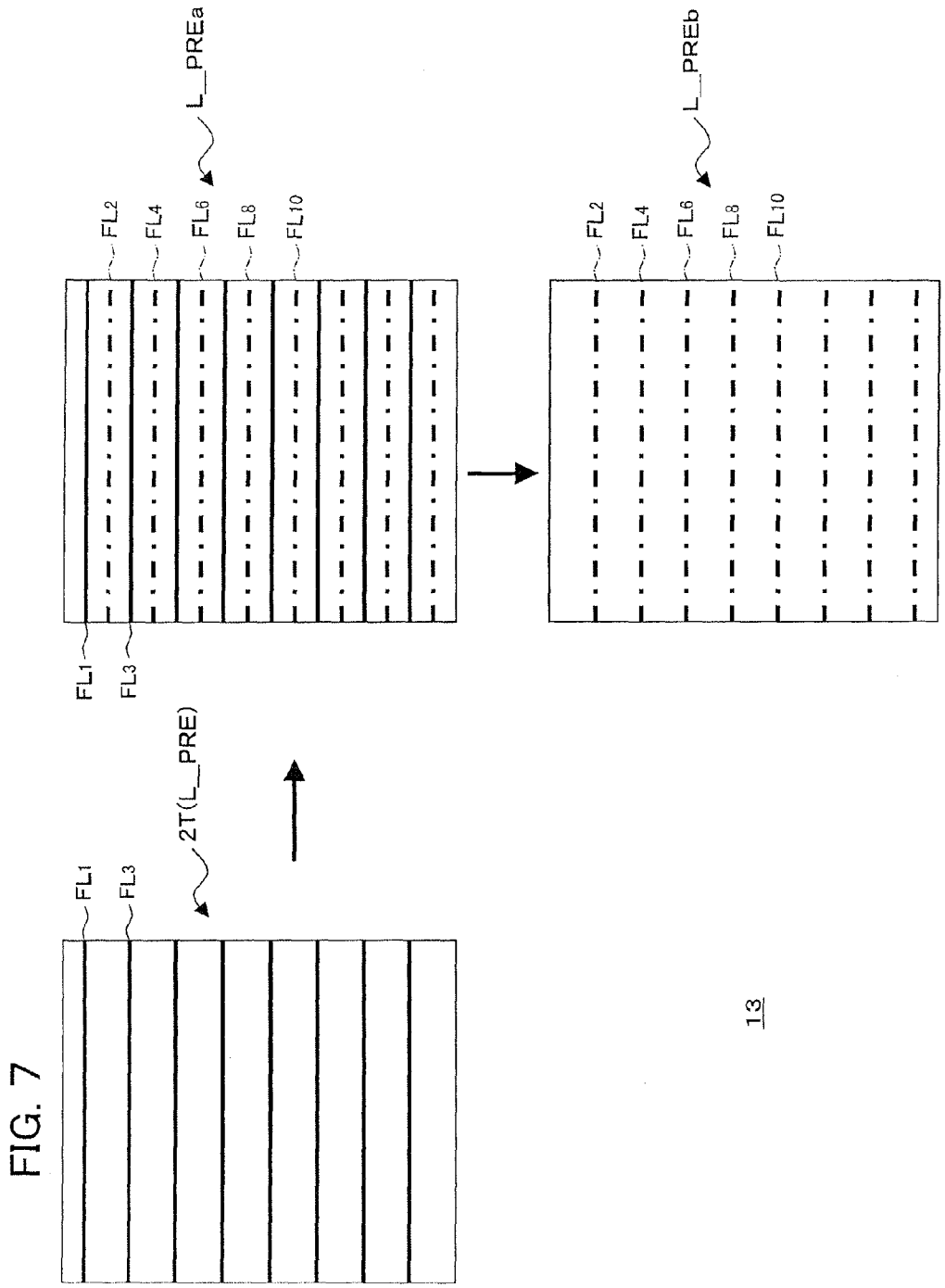
FIG. 7 is a diagram for explaining the processing of a transform circuit shown in FIG. 6.

For example, the conversion circuit 13 generates a lower significant predicted image data L_PREa obtained by interpolation of the top field data 2T shown in FIG. 7 in the vertical direction, extracts line data corresponding to the scanning position of the bottom field data 2B shown in FIG. 3 to be encoded at the upper significant layer coding circuit 14 from the lower significant predicted image data L_PRE to generate the lower significant predicted image data L_PREb, and outputs this to the upper significant layer coding circuit 14.

The conversion circuit 13 outputs the attribute data BisTop and BTime corresponding to the lower significant predicted image data L_PRE input from the lower significant layer coding circuit 12 to the upper significant layer coding circuit 14.

The conversion circuit 13, when the upper significant layer and the lower significant layer have the same timing and both are top (or bottom) fields in the same way (where BTime and ETime are the same time and BisTop and EisTop have the same value), outputs the lower significant predicted image data L_PRE input from the lower significant layer coding circuit 12 as the lower significant predicted image data L_PREb as it is to the upper significant layer coding circuit 14.

Upper Significant Layer Coding Circuit

Figure 8:
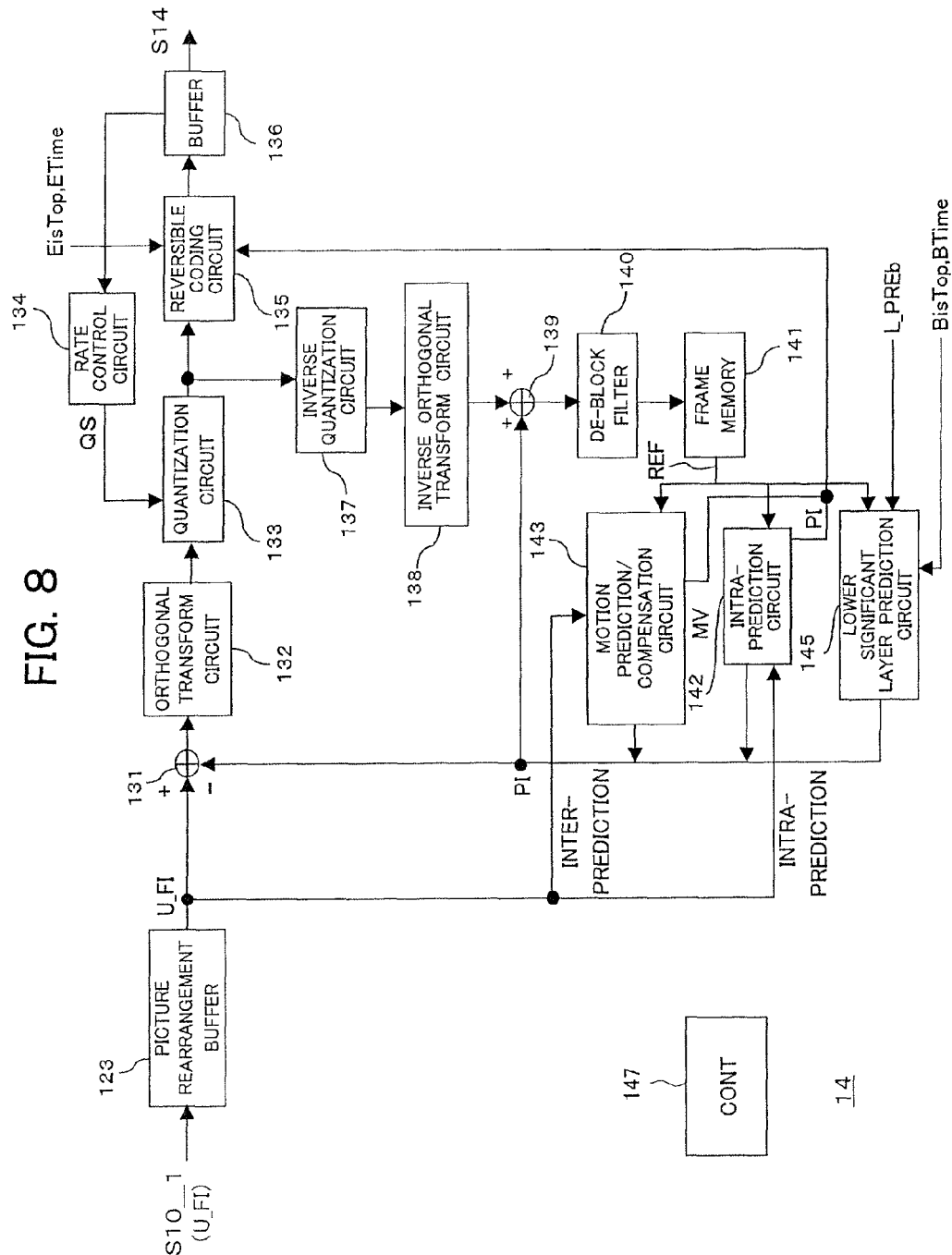
FIG. 8 is a view of the configuration of an upper significant layer coding circuit shown in FIG. 2.

FIG. 8 is a view of the configuration of the upper significant layer coding circuit 14 shown in FIG. 2.

The upper significant layer coding circuit 14 has for example a picture rearrangement circuit 123, processing circuit 131, orthogonal conversion circuit 132, quantization circuit 133, rate control circuit 134, reversible coding circuit 135, buffer memory 136, inverse quantization circuit 137, inverse orthogonal conversion circuit 138, adder circuit 139, de-block filter 140, frame memory 141, intra-prediction circuit 142, motion prediction/compensation circuit 143, and control circuit 147.

The picture rearrangement circuit 123 rearranges the field data U_FI of the interlace image data S10_1 read out from the delay circuit 11 shown in FIG. 2 to the sequence of coding in accordance with the GOP structure comprised of picture types I, P, and B, and outputs the same to the processing circuit 131, intra-prediction circuit 142, and motion prediction/compensation circuit 143.

The processing circuit 131 generates the image data showing the difference between the field data or frame data to be coded input from the picture rearrangement circuit 123 and the predicted image data PI input from the intra-prediction circuit 142, motion prediction/compensation circuit 143, or lower significant layer prediction circuit 145 and outputs this to the orthogonal conversion circuit 132.

The orthogonal conversion circuit 132 applies the a discrete cosine transform, Karhunen-Loewe transform, or other orthogonal transform to the image data input from the processing circuit 131 to generate the image data showing the transform coefficient (for example DCT coefficient) and outputs this to the quantization circuit 133.

The quantization circuit 133 quantizes the image data input from the orthogonal conversion circuit 132 (transform coefficient before the quantization processing) based on the quantization scale QS input from the rate control circuit 134 to generate the image data showing the transform coefficient after the quantization and outputs this to the reversible coding circuit 135 and inverse quantization circuit 137.

The rate control circuit 134 generates for example the quantization scale QS based on the image data read out from the buffer memory 136 and outputs this to the quantization circuit 133.

The reversible coding circuit 135 stores the image data obtained by variable length coding of the image data input from the quantization circuit 133 in the buffer 136.

At this time, the reversible coding circuit 135 stores the attribute data EisTop and ETime input from the hierarchical circuit 10 in the header data etc.

The reversible coding circuit 135 stores the movement vector MV input from the motion prediction/compensation circuit 143 or its difference movement vector, the identification data of the reference image data, and the intra-prediction mode input from the intra-prediction circuit 142 in the header data etc.

The image data stored in the buffer memory 136 is read out as the upper significant encoded data S14 to the multiplex circuit 15 shown in FIG. 2.

The inverse quantization circuit 137 applies the inverse quantization processing corresponding to the quantization at the quantization circuit 133 to the image data from the quantization circuit 133, generates data obtained by that, and outputs this to the inverse orthogonal conversion circuit 138.

The inverse orthogonal conversion circuit 138 applies the inverse transform to the orthogonal transform in the orthogonal conversion circuit 132 to the data input from the inverse quantization circuit 137 and outputs the thus generated image data to the adder circuit 139.

The adder circuit 139 adds the image data input (decoded) from the inverse orthogonal conversion circuit 138 and the predicted image data PI input from the intra-prediction circuit 142 or motion prediction/compensation circuit 143 to generate the reference (re-composed) picture data and outputs this to the de-block filter 140.

The de-block filter 140 eliminates block distortion of the reference picture data input from the adder circuit 139 and writes this into the frame memory 141.

The intra-prediction circuit 142 determines the mode of intra-prediction minimizing the residue in the macro block to be intra-encoded and a block size of the prediction block.

The intra-prediction circuit 142 uses 4×4 and 16×16 pixels as block sizes.

The intra-prediction circuit 142, when selecting the intra-prediction, outputs the predicted image data PI according to the intra-prediction to the processing circuit 131 and adder circuit 139.

The motion prediction/compensation circuit 143 performs the motion prediction based on the reference picture data REF which is already coded, then locally decoded and stored in the frame memory 131 and determines the movement vector minimizing the residue and the block size of the motion compensation.

The motion prediction/compensation circuit 143 uses 16×16, 16×8, 8×16, 8×8, 8×4, 4×8, and 4×4 pixels as block sizes.

The motion prediction/compensation circuit 143, when selecting the inter-prediction, outputs the predicted image data PI according to the inter-prediction to the processing circuit 131 and adder circuit 139.

The lower significant layer prediction circuit 145 performs the intra-prediction based on the lower significant predicted image data L_PREb input from the conversion circuit 13 shown in FIG. 2 and generates the predicted image data PI. At this time, the lower significant layer prediction circuit 145 specifies the lower significant predicted image data L_PREb used for the intra-prediction based on the attribute data BisTop and BTime input from the conversion circuit 13.

The predicted image data PI minimizing the difference from the image data to be coded is selected from among predicted image data PI generated by the intra-prediction circuit 142, motion prediction/compensation circuit 143, and lower significant layer prediction circuit 145 and output to the processing circuit 131.

The control circuit 147 performs the overall control of the upper significant layer coding circuit 14.

Multiplex Circuit

The multiplex circuit 15 multiplexes the lower significant encoded data S12 input from the lower significant layer coding circuit 12 and the upper significant encoded data S14 input from the upper significant layer coding circuit 14 to generate the encoded data S2.

Example of Operation of Coding Apparatus

An example of the operation of the coding apparatus 2 shown in FIG. 2 will be explained next.

The hierarchical (layered data processing) circuit 10 receives as input the progressive image data (progressive signal) S9 to be code and divides each of a plurality of frame data composing the progressive image data S9 into top field data and bottom field data. As shown in FIG. 3, the above divided top field data and bottom field data are alternately output to the delay circuit 11 and lower significant layer coding circuit 12. Due to this, as shown in FIG. 3, after the interlace image data S10_1 is written into the delay circuit 11, it is delayed by exactly the processing time of the lower significant layer coding circuit 12 and conversion circuit 13. The result is output to the upper significant layer coding circuit 14.

The interlace image data S102 is output from the hierarchical circuit 10 to the lower significant layer coding circuit 12.

The lower significant layer coding circuit 12 encodes the interlace image data S10_2 and outputs the lower significant encoded data S12 to the multiplex circuit 15.

The lower significant layer coding circuit 12 generates the lower significant predicted image data L_PRE. This is interpolated at the conversion circuit 13 so that its scanning position coincides with the interlace image data S10_1, whereby the lower significant predicted image data L_PREb is generated.

The upper significant layer coding circuit 14 intra-encodes the interlace image data S10_1 (field data U_FI) based on the lower significant predicted image data L_PREb to generate the upper significant encoded data S14.

The multiplex circuit 15 multiplexes the lower significant encoded data S12 input from the lower significant layer coding circuit 12 and the upper significant encoded data S14 input from the upper significant layer coding circuit 14 to generate the encoded data S2.

Decoding Apparatus

FIG. 9 is a view of the configuration of the decoding apparatus 3 shown in FIG. 1.

The decoding apparatus 3 has for example a division circuit 51, delay circuit 52, lower significant layer decoding circuit 53, conversion circuit 54, upper significant layer decoding circuit 55, and re-composing circuit 56.

The decoding apparatus 3 basically performs the processing inverse to the processing of the coding apparatus 2 explained above.

Division Circuit

The division circuit 51 receives as input the above encoded data S2 generated by the coding apparatus 2, divides this to the lower significant encoded data S12 and upper significant encoded data S14, outputs the lower significant encoded data S12 to the lower significant layer decoding circuit 53, and writes the upper significant encoded data S14 into the delay circuit 52.

Delay Circuit

The delay circuit 52 delays the upper significant encoded data S14 input from the division circuit 51 by exactly the processing time in the lower significant layer decoding circuit 53 and conversion circuit 54 and outputs this to the upper significant layer decoding circuit 55.

Lower Significant Layer Decoding Circuit

Figure 10:
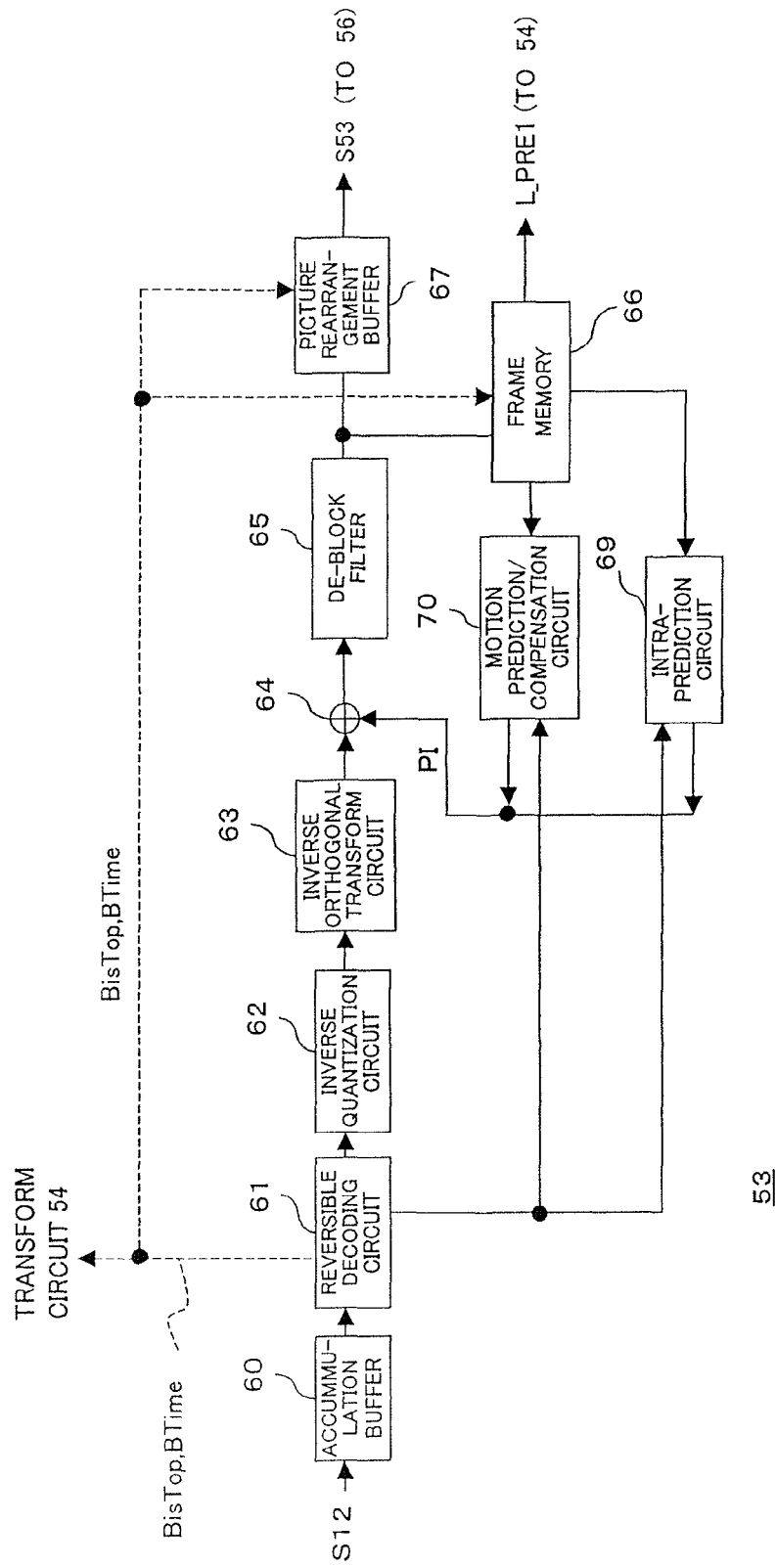
FIG. 10 is a view of the configuration of a lower significant layer decoding circuit shown in FIG. 9.

FIG. 10 is a view of the configuration of the lower significant layer decoding circuit 53 shown in FIG. 9.

The lower significant layer decoding circuit 53 has for example a storage buffer 60, reversible decoding circuit 61, inverse quantization circuit 62, inverse orthogonal transform circuit 63, adder circuit 64, de-block filter 65, frame memory 66, picture rearrangement buffer 67, intra-prediction circuit 69, and motion prediction/compensation circuit 70.

In the storage buffer 60, the lower significant encoded data S12 input from the division circuit 51 is written.

The reversible decoding circuit 61, when judging that the macro-block MB to be processed in the lower significant encoded data S12 is inter-encoded, decodes the movement vector written in its header portion and outputs this to the motion prediction/compensation circuit 70.

The reversible decoding circuit 61, when judging that the macro-block MB to be processed in the lower significant encoded data S12 is intra-encoded, decodes the intra-prediction mode information written in its header portion and outputs the same to the intra-prediction circuit 69.

The reversible decoding circuit 61 decodes the lower significant encoded data S12 and outputs this to the inverse quantization circuit 62. The reversible decoding circuit 61 further writes the attribute data BisTop and BTime included in the header data of the lower significant encoded data S12 into the frame memory 66 and picture rearrangement buffer 67 and, at the same time, outputs the same to the conversion circuit 54 shown in FIG. 9.

The inverse quantization circuit 62 inverse quantizes the image data decoded at the reversible decoding circuit 61 (orthogonal transform coefficient) based on a quantization parameter QP input from the reversible decoding circuit 61 and outputs the same to the inverse orthogonal transform circuit 63.

The inverse orthogonal transform circuit 63 applies the inverse orthogonal transform processing of 4×4 to the image data (orthogonal transform coefficient) input from the inverse quantization circuit 62 to generate the difference image data and outputs that to the adder circuit 64.

The adder circuit 64 adds the predicted image data PI from the motion prediction/compensation circuit 70 or intra-prediction circuit 69 and the difference image data from the inverse orthogonal transform circuit 63 to generate the image data and outputs this to the de-block filter 65.

The de-block filter 65 applies the de-block filter processing to the image data input from the adder circuit 64 and writes the decoded image data after the processing into the frame memory 66 and picture rearrangement buffer 67.

The decoded image data stored in the frame memory 66 is read out as lower significant predicted image data L_PRE1 to the conversion circuit 54 shown in FIG. 9.

The intra-prediction circuit 69 generates the predicted image data PI based on the intra-prediction mode input from the reversible decoding circuit 61 and the decoded image data read out from the frame memory 66 and outputs this to the adder circuit 64.

The motion prediction/compensation circuit 70 generates the predicted image data PI based on the decoded image data read out from the frame memory 66 and the movement vector input from the reversible decoding circuit 61 to generate the predicted image data PI and outputs this to the adder circuit 64.

The picture rearrangement buffer 67 stores the decoded image data written from the de-block filter 65.

The decoded image data stored in the picture rearrangement buffer 67 is read out to the re-composing circuit 56 shown in FIG. 9 as the lower significant decoded image data S53 in a sequence of display.

Conversion Circuit

The conversion circuit 54 shown in FIG. 9 will be explained next.

When the condition that upper significant encoded field data U_EFI input from the delay circuit 52 by the upper significant layer decoding circuit 55 (upper significant encoded data S14 read out from the delay circuit 52) and the lower significant predicted image data L_PRE1 output to the conversion circuit 54 by the lower significant layer decoding circuit 53 are field data of the same timing, one is the top field data, and the other is the bottom field data is satisfied, the scanning positions of these are different.

For this reason, the conversion circuit 54 judges whether or not the above condition is satisfied based on the attribute data EisTop and ETime in the upper significant encoded data S14 input from the delay circuit 52 and the attribute data BisTop and BTime input from the lower significant layer decoding circuit 53. When judging that the condition is satisfied, it applies the interpolation processing to the lower significant predicted image data L_PRE1 input from the lower significant layer decoding circuit 53 to generate lower significant predicted image data L_PRE1$a$.

The conversion circuit 54 extracts the line data corresponding to the scanning position of the upper significant encoded field data U_EFI decoded at the upper significant layer decoding circuit 55 from the lower significant predicted image data L_PRE1$a$ to generate lower significant predicted image data L_PRE1$b$ and outputs this to the upper significant layer decoding circuit 55.

The conversion circuit 13 outputs the attribute data BisTop and BTime corresponding to the lower significant predicted image data L_PRE1 input from the lower significant layer decoding circuit 53 to the upper significant layer decoding circuit 55.

The conversion circuit 54, when the upper significant layer and the lower significant layer have the same timing and both are top (or bottom) fields in the same way (where BTime and ETime are the same time and BisTop and EisTop have the same value), outputs the lower significant predicted image data L_PRE1 input from the lower significant layer decoding circuit 53 as the lower significant predicted image data L_PRE1$b$ as it is to the upper significant layer decoding circuit 55.

Upper Significant Layer Decoding Circuit

Figure 11:
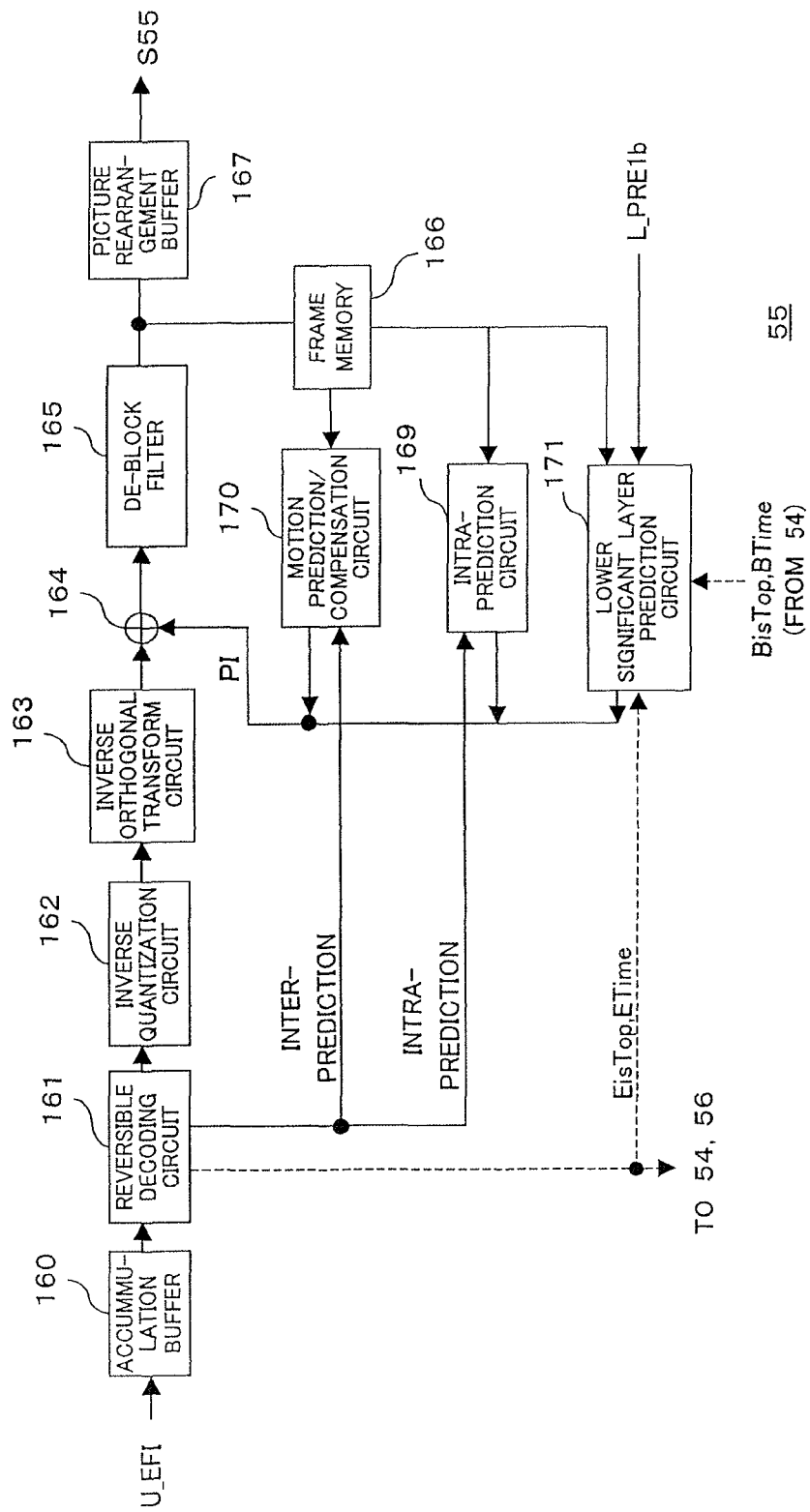
FIG. 11 is a view of the configuration of an upper significant layer decoding circuit shown in FIG. 9.

FIG. 11 is a view of the configuration of the upper significant layer decoding circuit 55 shown in FIG. 9.

The upper significant layer decoding circuit 55 has for example a storage buffer 160, reversible decoding circuit 161, inverse quantization circuit 162, inverse orthogonal transform circuit 163, adder circuit 164, de-block filter 165, frame memory 166, picture rearrangement buffer 167, intra-prediction circuit 169, motion prediction/compensation circuit 170, and lower significant layer prediction circuit 171.

In the storage buffer 160, the upper significant encoded field data U_EFI read out from the delay circuit 52 is written.

The reversible decoding circuit 161, when judging that the macro-block MB to be processed in the upper significant encoded field data U_EFI is inter-encoded, decodes the movement vector written in its header portion and outputs this to the motion prediction/compensation circuit 170.

The reversible decoding circuit 161, when judging that the macro-block MB to be processed in the upper significant encoded field data U_EFI is intra-encoded, decodes the intra-prediction mode information written in its header portion and outputs the same to the intra-prediction circuit 169.

The reversible decoding circuit 161, when judging that the upper significant encoded field data U_EFI is a lower significant layer intra-predicted based on the header portion, decodes the intra-prediction mode information written in its header portion and outputs the same to the intra-prediction circuit 169. Further, the reversible decoding circuit 161 decodes the upper significant encoded field data U_EFI and outputs the same to the inverse quantization circuit 162. Further, the reversible decoding circuit 161 outputs the attribute data EisTop and ETime included in the header data of the upper significant encoded field data U_EFI to the conversion circuit 54, re-composing circuit 56, and lower significant layer prediction circuit 171.

The inverse quantization circuit 162 inversely quantizes the image data (orthogonal transform coefficient) decoded at the reversible decoding circuit 161 based on the quantization parameter QP input from the reversible decoding circuit 161 and outputs the same to the inverse orthogonal transform circuit 163.

The inverse orthogonal transform circuit 163 applies the inverse orthogonal transform processing of 4×4 to the image data (orthogonal transform coefficient) input from the inverse quantization circuit 162 to generate the difference image data and outputs that to the adder circuit 164.

The adder circuit 164 adds the predicted image data PI from the motion prediction/compensation circuit 170, intra-prediction circuit 169, or lower significant layer prediction circuit 171 and the difference image data from the inverse orthogonal transform circuit 163 to generate the image data and outputs this to the de-block filter 165.

The de-block filter 165 applies de-block filter processing to the image data input from the adder circuit 164 and writes the decoded image data after the processing into the frame memory 166 and picture rearrangement buffer 167.

The intra-prediction circuit 169, when designating usual intra-prediction, generates the predicted image data PI based on the intra-prediction mode input from the reversible decoding circuit 161 and the decoded image data read out from the frame memory 166 and outputs this to the adder circuit 164.

The motion prediction/compensation circuit 170, when designating inter-prediction, generates the predicted image data PI based on the decoded image data read out from the frame memory 166 and the movement vector input from the reversible decoding circuit 161 and outputs this to the adder circuit 164.

The lower significant layer prediction circuit 171, when designating lower significant layer intra-prediction, generates the predicted image data PI by using the decoded image data read out from the frame memory 166 based on the intra-prediction mode input from the reversible decoding circuit 161 and the lower significant predicted image data L_PRE1$b$ input from the conversion circuit 54 and outputs this to the adder circuit 164.

At this time, the lower significant layer prediction circuit 171 selects and uses for example the lower significant predicted image data L_PRE1$b$ corresponding to the decoded image data read out from the frame memory 165 based on the attribute data EisTop and ETime input from the reversible decoding circuit 161 and the attribute data BisTop and BTime input from the conversion circuit 54.

The picture rearrangement buffer 167 stores the decoded image data written from the de-block filter 165.

The decoded image data stored in the picture rearrangement buffer 167 is read out to the re-composing circuit 56 shown in FIG. 9 as upper significant decoded image data S55 in the sequence of display.

Re-composing Circuit

The re-composing circuit 56 re-composes the upper significant decoded image data S55 input from the upper significant layer decoding circuit 55 and the lower significant decoded image data S53 input from the lower significant layer decoding circuit 53 to generates progressive image data S56.

Example of Operation of Decoding Apparatus

The operation of the decoding apparatus shown in FIG. 9 will be explained next.

The division circuit 51 receives as input the encoded data S2 explained above generated by the coding apparatus 2, divides this to the lower significant encoded data S12 and the upper significant encoded data S14, outputs the lower significant encoded data S12 to the lower significant layer decoding circuit 53, and writes the upper significant encoded data S14 into the delay circuit 52.

The delay circuit 52 delays the upper significant encoded data S14 input from the division circuit 51 by exactly the processing time in the lower significant layer decoding circuit 53 and conversion circuit 54 and outputs the same to the upper significant layer decoding circuit 55.

The lower significant layer decoding circuit 53 decodes the lower significant encoded data S12, generates the lower significant decoded image data S53, and outputs this to the re-composing circuit. Further, the lower significant layer decoding circuit 53 generates the lower significant predicted image data L_PRE1 and outputs the same to the conversion circuit 54.

The conversion circuit 54 performs the interpolation processing so that the lower significant predicted image data L_PRE1 coincides in scanning position with the upper significant field image data U_EFI and generates the lower significant predicted image data L_PRE1$b$.

The upper significant layer decoding circuit 55 intra-decodes the upper significant field image data U_EFI based on the lower significant predicted image data L_PRE1$b$ to generate the upper significant decoded image data S55 and outputs this to the re-composing circuit 56.

The re-composing circuit 56 re-composes the upper significant decoded image data S55 input from the upper significant layer decoding circuit 55 and the lower significant decoded image data S53 input from the lower significant layer decoding circuit 53 to generate the progressive image data S56.

As explained above, according to the coding apparatus 2 of the embodiment of the present invention, the interlace image data can be encoded in each of the lower significant layer coding circuit 12 and upper significant layer coding circuit 14 shown in FIG. 2.

Further, according to the decoding apparatus 3 of the embodiment of the present invention, the interlace image data can be decoded in each of the lower significant layer decoding circuit 53 and upper significant layer decoding circuit 55 shown in FIG. 9.

In this way, according to the present embodiment, the interlace image data can be handled in each class of the hierarchical coding.

Further, according to the present embodiment, when decoding the hierarchically encoded image data, the interlace image data can be handled in each class.

The present invention is not limited to the above embodiment.

Namely, a person skilled in the art could make various modifications, combinations, sub-combinations, and alterations to the above embodiment within the technical scope of the present invention or the equivalent scope of the same.

Figure 12:
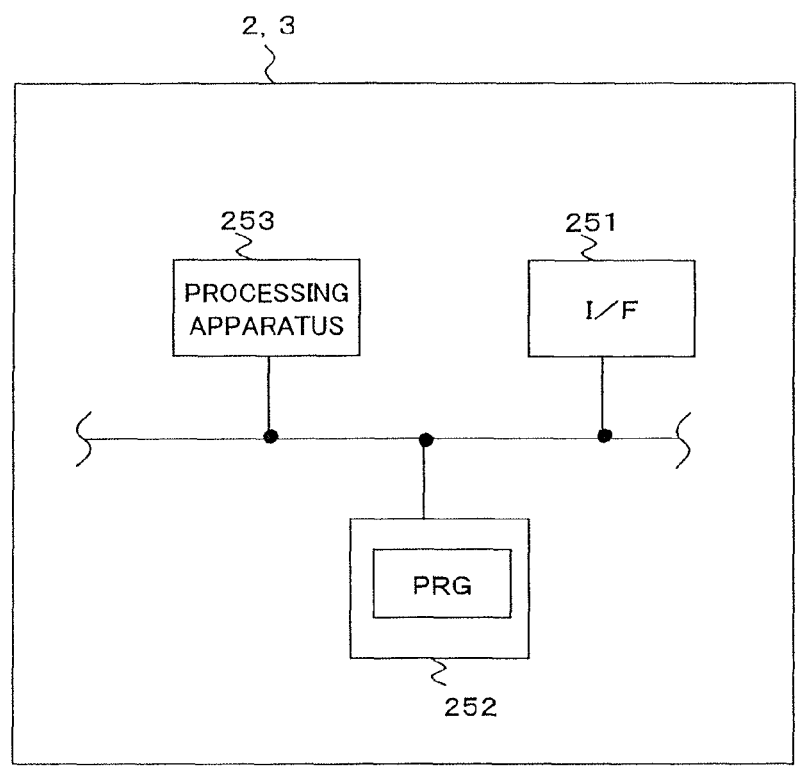
FIG. 12 is a diagram for explaining a modification of the embodiment of the present invention.

For example, all or part of the functions of the coding apparatus 2 or decoding apparatus 3 explained above can be executed by a CPU (central processing unit) or other processing circuit 253 according to the programming of the program PRG stored in a memory 252 as shown in FIG. 12.

In this case, the image data to be coded or decoded is input via an interface 251, and the processing result thereof is output.

For reference, an explanation will be given of the relationship between the configuration of the present embodiment and the configuration of the present invention.

The coding apparatus 2 is an example of the coding unit or coding apparatus of the first aspect of the invention. When the processing content (functions) of the coding apparatus 2 is described by the program PRG shown in FIG. 12, the program PRG is an example of the program of the embodiment of the present invention.

The lower significant layer coding apparatus 12 shown in FIG. 2 is an example of the first coding unit or first coding means, the conversion circuit 13 is an example of the conversion unit or converting means, and the upper significant layer coding circuit 14 is an example of the second coding unit or second coding means.

The hierarchical circuit 10 is an example of the division unit or dividing means of the present invention.

The decoding apparatus 3 is an example of the decoding apparatus of the embodiment of the present invention. When the processing contents (functions) of the decoding apparatus 3 are described by the program PRG, the program PRG is an example of the program of the embodiment of the present invention.

The lower significant layer decoding circuit 53 shown in FIG. 9 is an example of the first decoding unit or first decoding means of the embodiment of the present invention, the conversion circuit 54 is an example of the conversion unit or converting means, and the upper significant layer decoding circuit 55 is an example of the second decoding unit or second decoding means.

The invention claimed is:

1. A decoding apparatus for decoding two encoded field data obtained by hierarchically (layered data) encoding two field data associated with each of a plurality of picture data composing a moving picture image, said decoding apparatus comprising:
    a first decoding unit configured to decode one of the two encoded field data and obtain information associated with the two encoded field data;
    a conversion unit configured to interpolate first predicted image data generated by decoding by the first decoding unit according to the information and generate second predicted image data of a scanning position of the other encoded field data of the two encoded field data; and
    a second decoding unit configured to decode the other encoded field data of the two encoded field data based on the second predicted image data generated by the conversion unit.

2. A decoding method for decoding two encoded field data obtained by hierarchically (layered data) encoding two field data associated with each of a plurality of picture data composing a moving picture image, said decoding method comprising:
    a first step of decoding one of the two encoded field data and obtaining information associated with the two encoded field data;
    a second step of interpolating first predicted image data generated by decoding by the first step according to the information and generating second predicted image data of a scanning position of the other encoded field data of the two encoded field data; and
    a third step of decoding the other encoded field data of the two encoded field data based on the second predicted image data generated in the second step.

* * * * *